Oct. 14, 1947.    P. F. BARNHART    2,429,043
BOTTOM HOLE GAS ANCHOR
Filed April 5, 1943    2 Sheets-Sheet 2
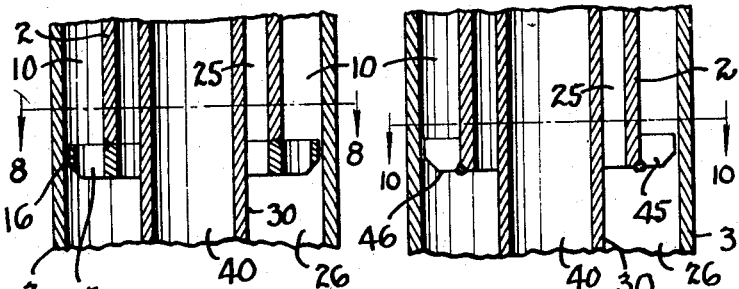
Fig. 7.    Fig. 9.
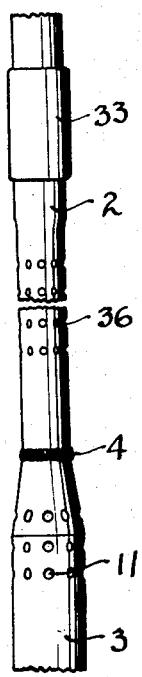
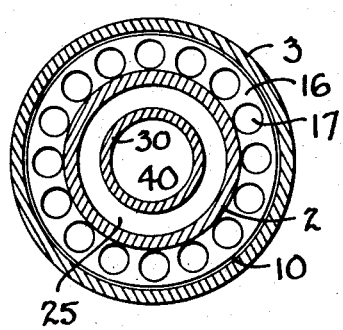
Fig. 8.    Fig. 10.
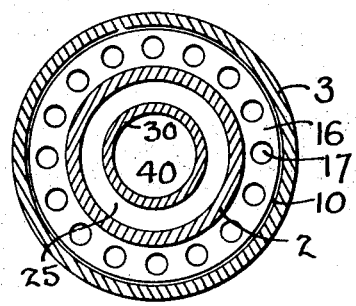
Fig. 5.
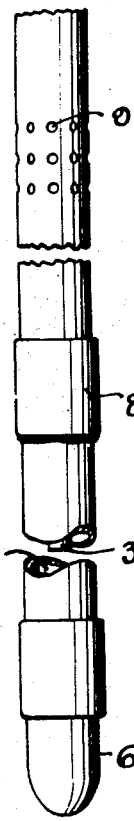
Fig. 6.
PAUL F. BARNHART.
INVENTOR.
BY    Lester B. Clark
ATTORNEY.

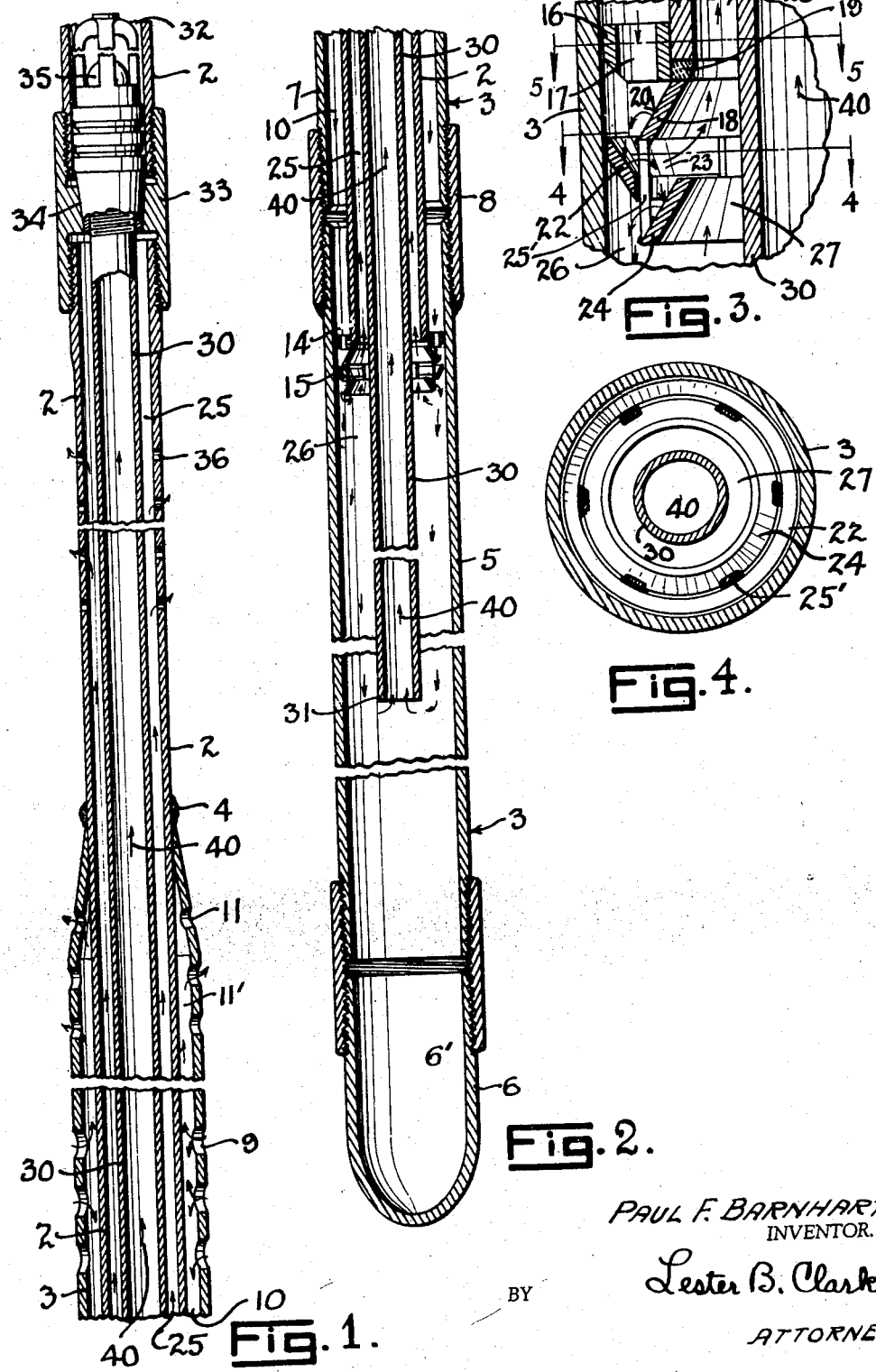

Patented Oct. 14, 1947

2,429,043

UNITED STATES PATENT OFFICE 2,429,043

BOTTOM HOLE GAS ANCHOR

Paul F. Barnhart, Houston, Tex.

Application April 5, 1943, Serial No. 481,814

10 Claims. (Cl. 103—220)

The invention relates to a bottom hole gas anchor of the type utilized with a pumping mechanism whereby oil is elevated in the well up to the surface.

In producing the wells, the formation usually yields oil, gas and some solids in the form of sand or fine particles of foreign matter. In order to elevate the oil, it is desirable to separate as much of the solids as possible and also separate the gas so that a reciprocating pump will act upon the liquids and will not be gas locked, due to the presence of gas in the pumping chamber.

The present invention operates upon the principle that if the velocity of flow is progressively reduced to a minimum while traveling vertically downward, separation of the gas, liquids and solids will occur, due to the distinct differences in relative specific gravity of the gas, liquids and solids, and further due to the force of gravity and due also to the fact that the flow, together and separately of gas, liquids and solids, is directed in a particular manner by the design and construction of the present device.

It is one of the objects of the invention to provide a gas anchor having a housing of a maximum diameter size which can be safely deposited in the well so as to provide a maximum size expansion chamber which will permit the maximum reduction in the velocity of flow of the gas, liquids and solids from the formation to the pump.

Another object of the invention is to reduce the velocity of flow progressively step by step to a minimum so as to encourage the separation of the gases, liquids and solids. This separation is accomplished by providing a plurality of passages for the flow of the material in the assembly whereby the flow thru any other passage or passages after the first passage obtains a further reduction in the velocity of flow compared with the velocity in the first passage.

Another object of the invention is to permit the ready escape of gas from the incoming material at a plurality of stages in the passage of the material from the formation to the pump, and the escaping of such gas is so directed as to cause a minimum of interference or counterflow and co-mingling of such gas with incoming fluids moving from formation to the pump.

Another object of the invention is to reverse the direction of flow of the liquid in the last stage of the procedure so as to facilitate the separation of solids from the liquid, just prior to the liquid starting upwardly in the well.

Another object of the invention is to encourage the flow of liquid from the formation downwardly thru the assembly while simultaneously permitting the escape of gas upwardly. This natural tendency is materially aided by the construction due to the progressive reduction in velocity of flow and the provision of gas outlets at the point of each reduction in the velocity of flow.

Another object of the invention is to provide a combination housing, tubing and tail pipe assembly in combination with a baffle structure to facilitate the separation of gas, liquids, and solids in a well bottom assembly.

Another object of the invention is to provide a gas anchor assembly which can be separated so as to facilitate complete inspection, cleaning and replacement of the baffle structure which under some conditions may be subjected to wear, due to the flow of materials thereby.

Another object of the invention is to provide a specified length tail pipe in conjunction with specified lengths of fluid and gas passages so as to provide desired periods of time for downward vertical flow of material thru these fluid passages before the fluid starts up the well and in this manner allow for maximum separation of gases, liquids and solids.

Still another object is to provide a gas anchor for wells where there will be a maximum area and a minimum velocity of flow at the location where the escaping liquid must effect a reverse flow.

It is also an object of the invention to provide a gas anchor having a tail pipe and a plurality of material passages whereby a retarted velocity of flow for the same volume of material occurs of flow for the same volume of material occurs at a passage subsequent to the first passage and prior to entry of the liquid into the tail pipe.

Other and further objects of the invention will be readily apparent when the following description is considered in connection with the accompanying drawings, wherein:

Fig. 1 is a vertical sectional view of the upper portion of the gas anchor.

Fig. 2 is a vertical sectional view of the lower portion of the gas anchor and is a continuation of Fig. 1.

Fig. 3 is an enlarged broken sectional view of the combination, housing, tubing, tail pipe and baffle structure.

Figs. 4 and 5 are sections on the line 4—4 and 5—5 respectively of Fig. 3.

Fig. 6 is a side elevation of the entire assembly in position, ready to be deposited in the well bore.

Fig. 7 is a vertical section of a modified form of a baffle structure.

Fig. 8 is a section taken on the line 8—8 of Fig. 7.

Fig. 9 is a vertical broken section of another modification of the baffle structure.

Fig. 10 is a horizontal section taken on the line 10—10 of Fig. 9.

Fig. 6 shows the entire gas anchor assembly in elevation and shows it as being made up of a tubing 2 which has a housing 3, affixed by welding or otherwise at 4 thereon. It will be noted that the housing is considerably larger in diameter than the tubing 2, the relative sizes thereof being apparent from the Figs. 1 and 2.

It is intended that this housing shall be of the maximum diameter which can be safely inserted in the well bore in which the tool is to be used. This is desirable so as to obtain the maximum area or passage space inside of the tool, as will be later described.

Figs. 1 and 2 show the housing 3 as being made up of a longitudinal section 5 having a bull plug 6 releasably connected on the lower end thereof and having an upper section 7 which may be connected to the section 5 by a coupling 8 which coupling may be spot welded either above or below to the longitudinal section 5. This may be a flush joint threaded connection, however, because this connection is to be removed in order to obtain access to the parts disposed therein and such flush joint thread connection should be so located at the coupling 8 as to expose these internal parts or in other words, longitudinal section 5 should extend to a point at the top of the coupling 8. The area 6' in the lower part of the housing 5 and the bull plug 6 may be known as a mud anchor to receive the solid particles which are separated.

This housing 3 as seen in Fig. 6 has a series of inlet openings 9 provided therein at a desired distance down from its point of fastening to the tubing at 4. These inlet openings are seen best in Fig. 1 and may be any desired size or number or configuration but it is intended that they will have a total area at least as great as the concentric annular space 10 which is the entry passage into the tool.

It is intended that as the flow of material from the formation passes thru these openings 9 into the housing 3 that some of the gas will move upwardly in the area 11' and escape thru the openings 11 into the casing of the well. The principal flow of oil and solids and some gas will move downwardly, however, and will obtain its first reduction in velocity in the passage 10. This reduction in flow will tend to permit a separation of gas from liquid or liquid and solids, due to the difference in specific gravity thereof.

It is further intended that the flow of material going from the formation into the pump through this passage 10 occurs in vertically downward direction and while some of the gas may be separating from the oil and solids during this period it is believed that there will be little if any escape of gas at certain volumes of flow in this passage 10 because of the velocity of flow of the material downwardly.

The concentric passage 10 which is shown in the drawings is formed as the space between the outside of the tubing 2 and the inside of the housing 3 and 5 and the flow downwardly thru this passage is encouraged by the reduction in pressure in the assembly caused by the reciprocation of the pump which will be carried in the tubing above the tool. This pump may be of any standard construction and, therefore, not illustrated herewith.

As the flow of material moves downwardly in the passage 10, it approaches the point 14, as seen in the top of Fig. 2 and then moves through a baffle assembly 15. This baffle assembly is best seen in detail in Fig. 3 and includes a plate 16 having a series of ports therein. These ports break up the flow of material into small streams which are directed against the first deflector member 18 which is shown as having been affixed to the lower end of the tubing 2 by means of the connecting weld or ring 19. The arrows indicate the path of the flow and it will be seen that the flow will impinge against the outer surface 20 of this reflector plate 18, so that it is thrown outwardly. The flow next impinges upon the intermediate deflector plate 22 which is shown in Fig. 3 as inclined inwardly so as to change the direction of the flow of material to facilitate separation of the gas, liquids and solids. The deflector members 22 and 24 are suitably supported from the member 18 by the legs 25', as seen in Figs. 3 and 4.

It will be noted from Fig. 3 that the flow is now directed on a lower baffle plate 24 and that there is a space 23 between the plates 24 and 18 which leads upwardly to the concentric space 25 inside of the tubing so that an escape for gas is provided at this point in the baffle. The remaining material impinging against the outer surface of the plate 24 will move downwardly into the space 26 which is in the form of a separation chamber inside of the housing 5.

Any gas separating, due to the additional expansion in the chamber 26 and due to the reduced velocity of flow, may escape up thru the opening 27 on the inside of the lower deflector member 24, and thus move upwardly into the space 25 between the inside of the tubing 2 and outside of tail pipe 30.

The provision of the baffle assembly tends to destroy the jetting effect of the flow from the passage 10 as it discharges into the area or passage 26. This gives a relatively free upflow area at 23 and 27.

Figs. 1 and 2 show a tail pipe 30 as being disposed in the tubing and of such a length that its lower end 31 is spaced in the separation chamber 26 below the bottom of the tubing 2 and baffle assembly 15. The lower end 31 is open and leads upwardly into the pump chamber 32 inside of the tubing 2 above the coupling 33. This tail pipe may be supported on a seat and seal 34 of the conventional type and may have at its upper end the standing valve 35 if desired therein.

This tail pipe 30 with the inside of the tubing 2 defines the gas escape passage 25 heretofore mentioned and Fig. 1 shows a plurality of outlets 36 for the gas from this gas passage 25 so that the gas may move outwardly from chamber 26 and openings 27 and 23 and passage 25 into the well bore or casing. It is understood that the gas moves into the casing and can be permitted to escape at the well head and is generally known as casinghead gas.

Thus it is apparent that the gas to escape is not required to force its way thru a stream of material in a counter-current flow as is required in prior devices.

It will be noted also that this passage 25 is of sufficient size and area to permit satisfactory upward flow and movement of the gas out of the assembly thru outlets 36.

Due to the reciprocation of the pump in the pump chamber 32, it seems clear that there will be a downward suction or pull on the material entering the chambers 10 and 26 and an upward suction or pull on the fluid thru the tail pipe 30 as indicated by the arrows 40. This flow of fluid from the formation to the pump obtains a complete reversal in direction of the flow from that downwardly in the chambers 10 and 26 when it moves into the tail pipe 30 so that the flow reverses its direction from vertically downward to vertically upward in passing around the lower end 31 of the tail pipe. This reversal of the direction of flow tends to throw out any solid matter into the mud anchor 6' which may have been carried along with the liquid. This solids accumulating anchor chamber is equipped with a threaded bull plug connection on bottom so that it may be parted to clean out and inspect the chamber.

It seem obvious that with the construction of the complete assembly just described there will be an initial gas, oil and solids separating chamber as the material moves into and down thru passage 10. It is definitely apparent that a great part of the gas which enters the openings 9 with the fluid and solids will not proceed in a vertically downward direction in passage 10 because of the specific gravity of the gas, but instead will move vertically upward immediately after entering openings 9 into the gas passage or area 11' and out through openings 11 back into the well bore at a distance above the inlet openings 9. This gas leaving the assembly thru openings 11 will continue vertically upward in the well bore and escape at the surface from the casing and is generally known as casinghead gas.

There will thus be a definite velocity of flow in the passage 10 and as the material reaches the baffle structure 15, agitation of the material is greatly increased in order to effect as much separation of the gas from the liquids and solids as possible.

As the material continues to move vertically downward thru passage 26, a different velocity of flow is obtained which is considerably reduced as compared with the velocity of flow that obtained while this same material moved downward thru the above passage 10. This further marked reduction in velocity of flow obtained by the material as same enters and moves down thru passage 26 causes an additional quantity of the gas to separate from the liquid and solids and such gas will discontinue its downward direction of flow after entering passage 26 and because of the specific gravity of the gas in conjunction with further retarded downward velocity of flow of the material, the gas will move vertically upward thru passage 27 and passage 23 and into gas passage 25 and out of the gas outlet opening 36 at the upper part of passage 25.

In all there are two major and pronounced progressive passages in the reduction of the velocity of flow of the material which reduction in velocity of flow occurs progressively first in the passage 10 and then in the passage 26 as the material moves thru the assembly from the formation into the pump. There are also two progressive stages of separating the gas from the liquid and solids while moving downward thru each of the two above mentioned passages 10 and 26 respectively.

The baffle assembly 15 is so designed and the inlet of the gas thru spaces 27 and 23 into the gas passage 25 is of such design that the additional gas separating from the liquids and solids through baffle 15 and passage 26 will permit this gas to enter passage 25 while moving vertically upward with a minimum amount of interference and co-mingling of the liquids and solids moving vertically downward thru passage 26 into the pump. This feature greatly aids in obtaining a complete separation of the gas from the liquids and solids moving vertically downward thru passage 26.

As an illustration, and not a limitation, an example will be given where the flow is, say, 500 bbls. per day of material from the formation. With a flow of this sort, and the housing 3, having an inside diameter of 4.026 inches and the outside diameter of the tubing 2 being 2.875 inches, there would be an annular space between the two which constitutes the passages 10 and 11'. This area would be an annulus having an area of 0.0431 square foot. Presuming that the flow is 500 barrels per 24-hour day, the flow through this passage would be 0.0325 cubic foot per second. When the area is considered, and the volume of flow, it is apparent that the velocity in the passage 10 would be 0.755 foot per second.

This, of course, is a reduction in the volume and velocity of flow because of the fact that some of the gas has escaped by moving upwardly in the gas passage 11'.

The passage 26 will be an annular space created by the inside diameter of the housing 5 and the outside diameter of the tail pipe 30. This area may be computed as 0.0731 square foot and if the volume of flow were 0.0325 cubic foot per second then the velocity would be 0.445 foot per second. These figures will not hold true, however, and will vary due to the fact that considerable gas escapes thru 23 and 27 which will tend to further reduce the velocity and volume in 26.

It seems obvious, therefore, that the area of 26 is considerably greater than the area of 10, and that a velocity drop will occur.

It is also the purpose to obtain certain relative periods of time of travel of the material through the area and length of the passages while accomplishing a drop in velocity. Computations, therefore, indicate that the distance in some cases in the example given from the ports 9 to the baffle plate 16 in the passage 10 may be 10 feet and that the time of flow of any minute particle of material down thru this area and length of passage consequently would be 13.25 seconds. The length of the tail pipe 30 below the baffles should then be 5.9 feet as a minimum in order to obtain at least a same time of flow down thru this passage 26 of 13.25 seconds. In some instances and circumstances the parts will be so constructed and arranged that there will be no instance wherein the time of downward travel through the area and length of passage 26 will be less than the time of downward travel through the area and length of passage 10. In this manner, there will be an equal or greater time of flow of the material down thru passage 26 as compared with passage 10 which will further materially aid in obtaining maximum separation of the gas, liquids and solids.

It seems obvious that each particular gas anchor may be proportioned and arranged in its construction in accordance with the estimated gas-oil ratio and other conditions expected to be encountered in that particular well. The lengths of the passages can be arranged by adjusting the position of the parts or rather by building each piece of equipment with the desired lengths of pipe so as to obtain desired times of travel down thru respective passages with desired rates of flow at progressively retarded velocities thru such passages.

Broadly, the invention contemplates a gas anchor having a plurality of material passages whereby a retarded velocity of flow for the same volume of material occurs as the material moves from one passage to the next.

What is claimed is:

1. A bottom hole gas anchor for wells including a well tubing, a tail pipe sealed therein, said tail pipe extending below the tubing and providing for an oil flow upwardly therethru, and an annular gas escape passage formed inside the tubing by said tail pipe, a housing of the largest possible diameter which can be run into the well and carried by the tubing to enclose the lower ends of each the tail pipe and the tubing so as to provide an annular entry passage enclosing the end of the tubing and a separation chamber enclosing the end of the tail pipe, a series of entry openings in the housing for material from the formation so that as the flow passes into the housing from said openings the gas will tend to move upwardly in said housing while the liquid and solids will tend to move down thru said entry passage due to gravity and due to the flow thru said tail pipe, another series of openings in said housing above said entry openings to permit the outlet of gas rising from the entry openings, a series of openings in the tubing above the housing to encourage escape of gas moving into said gas escape passage as the flow emerges from the entry passage into the separation chamber below the end of the tubing and above the end of the tail pipe, said chamber extending substantially below said tail pipe so as to provide a mud anchor to receive solids separating from the gas and liquid as the rate of flow diminishes in the chamber and as the direction of flow is reversed as the gas enters the gas passage tubing and the liquid enters the tail pipe.

2. The combination of a well tubing and gas anchor including a tail pipe in the tubing and forming a gas escape passage in the tubing, a housing enclosing the tubing and tail pipe whereby a combination entry and gas passage is formed about the tubing, entry openings into said passage, a gas outlet into the gas portion of said entry passage above said entry openings, gas outlets in said tubing above said housing, an open lower end on said tail pipe whereby gases, liquids and solids entering said housing are separated to flow the liquid up thru the tail pipe, the gas out of the housing and tubing outlets and to collect the solids in the bottom of the housing as the rate of flow is decreased and the direction of flow reversed, and a baffle means at the end of the tubing in said housing to facilitate separation into said gas inlets.

3. In a gas anchor having a housing, tubing and tail pipe concentrically arranged to provide gas outlet, entry, and gas escape passages for a decrease in the velocity of flow to facilitate separation of the gas and liquid and solids, a baffle structure in the entry passage comprising a plate, a series of ports therein, a series of oppositely inclined deflecting members against which the flow from the ports will impinge, a passage from between two of said members for the escape of gas into said tubing, a passage between two of the members for the passage of material into a separation chamber in said housing to decrease the velocity of flow, the lower end of said tail pipe being open for the flow of liquid.

4. In a gas anchor having a housing, tubing and tail pipe concentrically arranged to provide gas outlet, entry, and gas escape passages for a decrease in the velocity of flow to facilitate separation of the gas and liquid and solids, a baffle structure in the entry passage comprising a plate, a series of ports therein, a series of oppositely inclined deflecting members against which the flow from the ports will impinge, a passage from between two of said members for the escape of gas into said tubing, a passage between two of the members for the passage of material into a separation chamber in said housing to decrease the velocity of flow, the lower end of said tail pipe being open whereby a pump in said tubing will draw out the liquid.

5. In a gas anchor having a housing, tubing and tail pipe concentrically arranged to provide gas outlet, entry, and gas escape passages for a decrease in the velocity of flow to facilitate separation of the gas and liquid and solids, a baffle structure in the entry passage comprising a plate, a series of ports therein, a series of oppositely inclined deflecting members against which the flow from the ports will impinge, a passage from between two of said members for the escape of gas into said tubing, a passage between two of the members for the passage of material into a separation chamber in said housing to decrease the velocity of flow, the lower end of said tail pipe being open for the flow of liquid, and openings in said housing and said tubing for gas outlet passage and gas escape passage respectively to allow escape of the gas separating.

6. A gas anchor to reduce the velocity of flow of material from the formation which comprises a housing of the maximum size insertable in the well, a tubing extending into the housing, entry openings in the housing so that the flow will be downwardly inside the housing around the tubing, outlets from the housing above said inlets for the escape of separating gases, a baffle structure in the housing at the end of the tubing to encourage gas to separate and flow up the tubing, outlets from the tubing above the housing, and a tail pipe in the tubing extending below the tubing into the housing so that liquid moving downwardly into the housing may be pumped therefrom after the separation of the gas.

7. A gas anchor to reduce the velocity of flow of material from the formation which comprises a housing of the maximum size insertable in the well, a tubing extending into the housing, entry openings in the housing so that the flow will be downwardly inside the housing around the tubing, outlets from the housing above said inlets for the escape of separating gases, a baffle structure in the housing at the end of the tubing to encourage gas to separate and flow up and out of the tubing without interfering with or co-mingling with liquids and solids, outlets from the tubing above the housing, and a tail pipe in the tubing extending below the tubing into the housing so that liquid moves downwardly into the housing after the separation of the gas, said housing forming a separating chamber which further reduces the velocity of flow to facilitate the separation of gases, liquids and solids.

8. A baffle structure for gas anchors having a concentrically spaced housing, tubing and tail pipe assembly including a ported plate about the tubing in the housing so that the material flowing downwardly therethru is broken up into streams thru the ports, an inclined deflector to deflect the flow outwardly, another inclined member to receive such flow and direct it inwardly below the end of the tubing so that gas separating may move up thru the tubing, still another deflector member to direct the flow outwardly against the housing, and a gas passage thru said member to the tubing whereby liquid is directed down inside the housing around the tail pipe and gas upwardly inside the tubing around the outside of the tail pipe.

9. A gas anchor including concentric housing, tubing and tail pipe structures, a baffle to facilitate separation of gases and liquids carried by the end of the tubing and disposed in the housing, means to affix the top of the housing to the tubing, and a connection in the housing just above said baffle so that separation thereof permits access to said baffle.

10. A gas anchor including concentric housing, tubing and tail pipe structures, a baffle to facilitate separation of gases and liquids carried by the end of the tubing and disposed in the housing, means to affix the top of the housing to the tubing, and a connection in the housing just above said baffle so that separation thereof permits access to said baffle, said baffle including a ported plate.

PAUL F. BARNHART.

REFERENCES CITED

The following references are of record in the file of this patent:

UNITED STATES PATENTS

| Number | Name | Date |
|---|---|---|
| 1,628,900 | Neilsen | May 17, 1927 |
| 1,601,921 | McCoy | Oct. 5, 1926 |
| 1,592,079 | Chancellor et al. | July 13, 1926 |
| 1,603,874 | Scott et al. | Oct. 19, 1926 |
| 609,269 | Etheridge | Aug. 16, 1898 |
| 1,338,829 | Green | May 4, 1920 |
| 1,542,599 | Blanton | June 16, 1925 |
| 1,682,114 | Carlson | Aug. 28, 1928 |
| 1,697,321 | Marsh | Jan. 1, 1929 |
| 1,732,499 | Chancellor | Oct. 22, 1929 |
| 2,029,323 | Jones | Feb. 4, 1936 |
| 2,143,836 | Anderson | Jan. 17, 1939 |